United States Patent [19]
Benson

[11] 3,964,779
[45] June 22, 1976

[54] EXPANSIBLE OPERATOR'S CAB

[75] Inventor: William Merle Benson, Santa Clara, Calif.

[73] Assignee: FMC Corporation, San Jose, Calif.

[22] Filed: Sept. 23, 1974

[21] Appl. No.: 508,474

[52] U.S. Cl. ............................... 296/27; 296/28 C; 296/146
[51] Int. Cl.² ......................................... B62D 25/02
[58] Field of Search .............. 296/26, 27, 28 C, 146, 296/152, 153; 180/89 R

[56] References Cited
UNITED STATES PATENTS

| | | | |
|---|---|---|---|
| 2,134,487 | 10/1938 | Levinson | 296/146 X |
| 2,997,333 | 8/1961 | Kauffman et al. | 180/89 R X |
| 3,801,149 | 4/1974 | Reimann | 296/26 X |

*Primary Examiner*—Albert J. Makay
*Assistant Examiner*—Donald W. Underwood
*Attorney, Agent, or Firm*—J. F. Verhoeven; J. W. Edwards; C. E. Tripp

[57] ABSTRACT

A completely enclosed operator's cab for a crane, or the like, is disclosed with a hinged expansion wall section which pivots outwardly when the operator is running the machine to provide additional room for the operator's comfort and accessibility to the controls of the machine. When in an expanded cab position, the expansion wall section maintains the enclosed feature of the cab and when in a retracted cab position, the compactness of the cab meets clearance requirements for transportation of the machine.

4 Claims, 25 Drawing Figures

FIG_1

EXPANSIBLE OPERATOR'S CAB

BACKGROUND OF THE INVENTION

Mobile material handling machines for the construction industry, such as cranes and shovels, have a lower frame, chassis, or carrier equipped with crawler treads or wheels and a rotatable upper frame supporting the machinery with a boom or other handling device. The operating controls for the machine are generally located on a forward corner of the rotatable frame for maximum visibility of the working area of the machine and are usually enclosed in a cab for the operator's safety and comfort. However, due to the size of the operating machinery and the need to keep the overall width of the machine to a minimum so as to permit travel over a highway, the space allocated for an operator's cab is limited. On at least some of the existing machines, the width of the cab provided does not permit sufficient room to locate the controls so the operator is given the most desirable position and sufficient freedom of movement for operating the machine at maximum efficiency with a minimum amount of fatigue for long periods.

The use of an enclosed operator's cab on a crawler mounted shovel is shown in U.S. Pat. No. 3,529,200 dated Nov. 7, 1950, to H. E. SWANSON. The method of reducing the profile of a vehicle by means of an operator's cab that pivots about a horizontal hinge from a vertical position to an inclined position to reduce the effective vertical height of the cab on a material handling machine is shown in U.S. Pat. No. 3,431,016 to J. H. MUNDT-PETERSEN et al dated Mar. 4, 1969.

It is an object of the present invention to provide an improved enclosed operator's cab for a crane or the like with greater working space for the operator without increasing the clearance required for the machine when traveling.

It is another object to provide an operator's cab with human engineered controls for operating the machine with ample freedom and comfort of the operator.

It is a further object to provide an operator's cab with an expansion wall section which when moved outwardly to an expanded cab position gives the operator ample width within the cab, but when the operator is not present, the expansion wall section may be closed to a compact traveling position not requiring additional road clearance.

It is a further object to provide an enclosed operator's cab with an expansion wall section which is sealed with the remaining cab structure to inhibit the entrance of dust, etc. in both expanded cab and retracted cab positions of the expansion wall section.

Further objects and advantages of the invention will become apparent by reference to the following specifications taken in conjunction with the accompanying drawings.

SUMMARY OF THE INVENTION

The present invention includes a completely enclosed cab for a crane or the like wherein the controls for the machine have been human engineered for the operator to work in arm-chain comfort with maximum efficiency. To provide sufficient room for the operator, the outward longitudinal side of the cab is expansible, being hinged at the forward outside corner of the cab and pivotable thereabout to move outwardly at the rear of the cab adjacent the operator's seat. The expansion wall section has a horizontal substantially triangular top flange and bottom flange portion connected by a substantially trapezoidal vertical side wall portion and a vertical narrow rectangular rear end flange portion. The expansion wall section overlaps the fixed portions of the cab in both an expanded cab position and a retracted cab position to maintain the sealed integrity of the cab and is latched in either of these positions for safety. The expansion wall section further includes a sealed sliding access door which may be latched in several positions. Maximum visibility for the operator is provided through the extensive use of glass panelled windows in the sides, ends and top of the cab.

BRIEF DESCRIPTION OF THE DRAWINGS

FIG. 3 is a side elevational view.

FIG. 25 is a sectional view taken along line 25—25 of FIG. 3.

DESCRIPTION OF THE PREFERRED EMBODIMENTS

Mobile material handling equipment or construction machines, such as cranes, shovels and excavators, have a lower frame chassis or carrier equipped with wheels or crawler treads for movement over the ground and an upper rotatable frame supporting the machinery with a boom or other handling device. The operator's controls are generally placed on the upper frame at an operator's station located for maximum visibility of the working area of the machine. These controls are further located within an enclosure or cab for the operator's safety and comfort from the surrounding environment. Due to the mobility of the machine over highways, the space available for a cab and the machinery is restricted by road clearance requirements but the interior cab space must be sufficient as not to interfere with the operation of the machine. Thus, the size of an operator's cab on a conventional machine is severely limited by the physical requirements of the machine, which frequently results in a compromise with the interior cab space requirements needed by the operator for operation of the machine.

Figure 1:
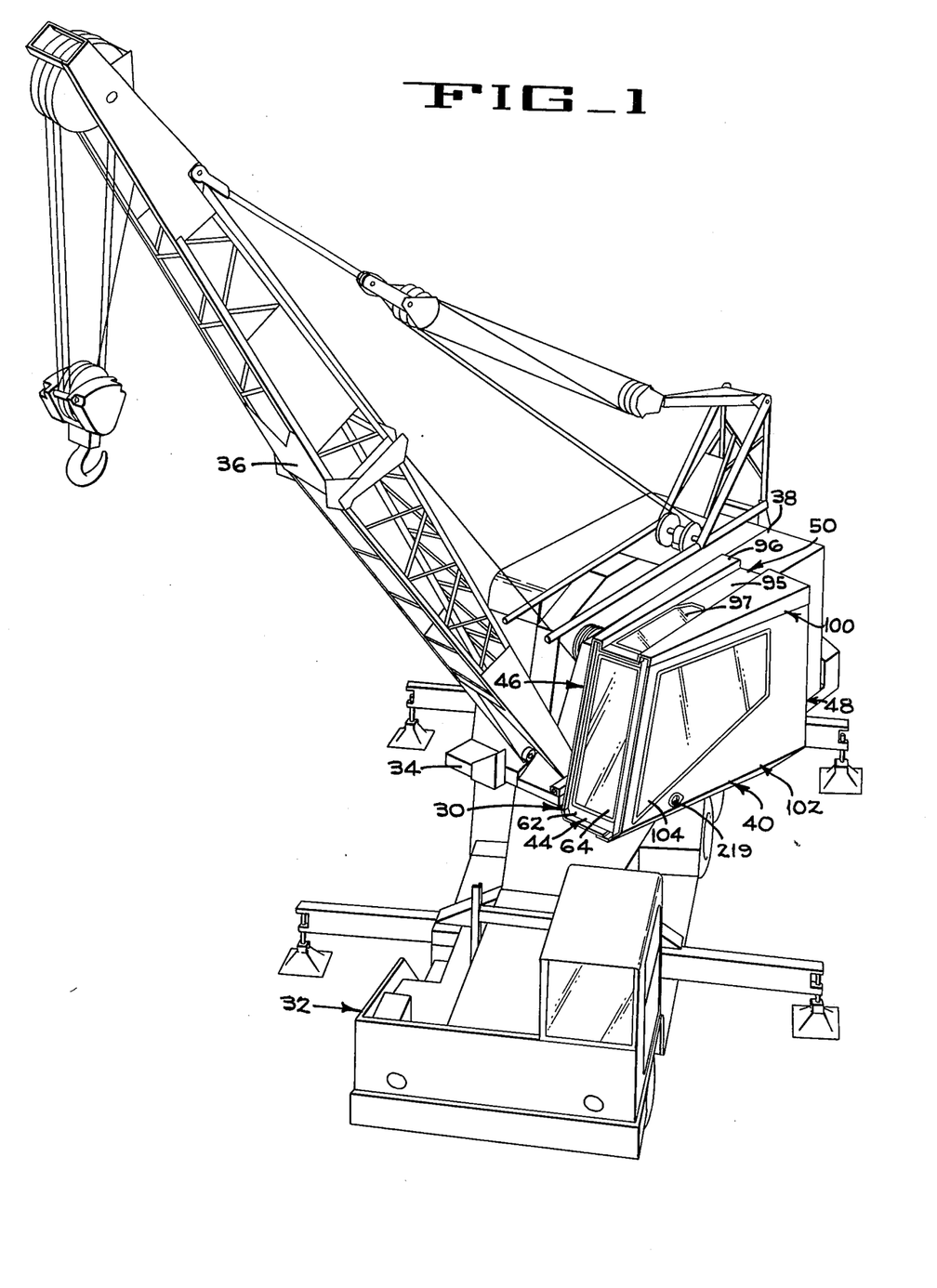
FIG. 1 is a perspective view of a truck mounted crane having the present expansible operator's cab.

The typical location of the operator's cab 30 on a truck mounted crane 32 is indicated in FIG. 1. The cab is positioned on a forward corner of a rotatable upper frame 34 in a confined area adjacent the pivot of a boom 36 and the main operating machinery and engine 38 for the crane. The cab 30 of the present invention has an expansible side or expansion wall section 40 which is shown in FIG. 1 in an expanded cab position as when occupied by an operator operating the crane.

It was found that the width allowed for the operator's cab in older machines did not provide adequate room and freedom of movement for a normal size man to conveniently operate the controls of the machine with maximum efficiency. Widening of the structure of the cab was not permissible as the cab would then project over the edge of the upper frame and would increase the overall width of the machine when traveling over the highway. It was discovered that sufficient width could be provided for the operator when working by adding an expansion wall section, hinged at its forward end to the cab for enclosing the outward side of the cab. This expansion wall section 40 does not add appreciably to the width of the front end of the cab but when pivoted outwardly and latched, provides about 8 inches additional width at the rear end of the cab where the operator is seated. When the machine is to be moved to a new operating site and road clearance again becomes a problem, the operator is not present in the cab. The expansion wall section can then be swung inwardly and latched in a retracted cab position with the triangular top and bottom flange sections of the expansion wall section overlapping the top and bottom portions of the fixed cab structure. In this retracted cab position, the width at the rear of the cab is the same as the width at the front of the cab so the travelling clearance requirements of the machine are not increased. Detailed description of the above cab 30 with its expansible side or expansion wall section 40 will now follow.

The cab 30 is a completely enclosed assembly to provide a comfortable inside environment for the operator and is sealed to prevent the entrance of dust, rain, etc. The main fixed or stationary structure of the cab, as shown in FIGS. 2–8, comprises a bottom section 42, a front end wall section 44, an inward side wall section 46, a rear end wall section 48, a top section 50 and a seat 51 for the operator. These sections of the cab are rigidly connected to form an integral stationary unit which is attached to the upper frame 34. The vertical side opening on the outward side of the cab structure is closed by the expansion wall section 40. FIG. 8 illustrates the position of the operator when seated at the operator's station in the cab 30 with operating controls within his convenient reach. The controls are grouped in two consoles 52 and 54 with one on each side of the operator so each of the operator's hands controls some operations of the machine while the operator is comfortably seated in an armchair-like position.

Figure 6:
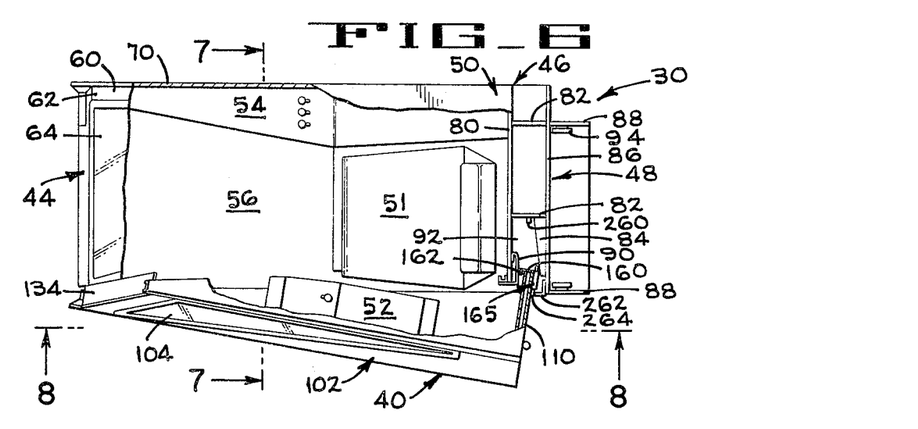
FIG. 6 is a plan view with the roof of the cab partially broken away for clarity.
Figure 7:
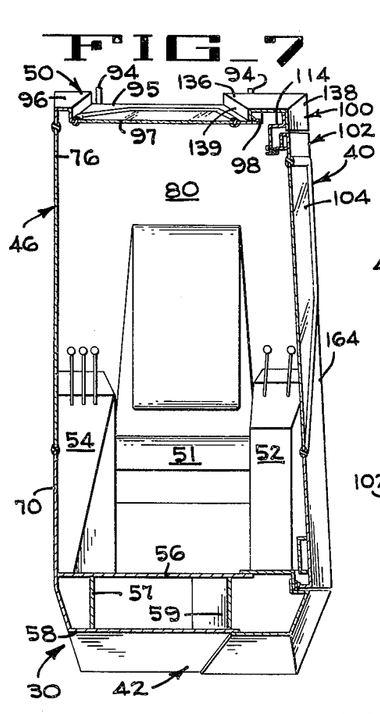
FIG. 7 is a sectional view taken along line 7—7 of FIG. 6.
Figure 8:
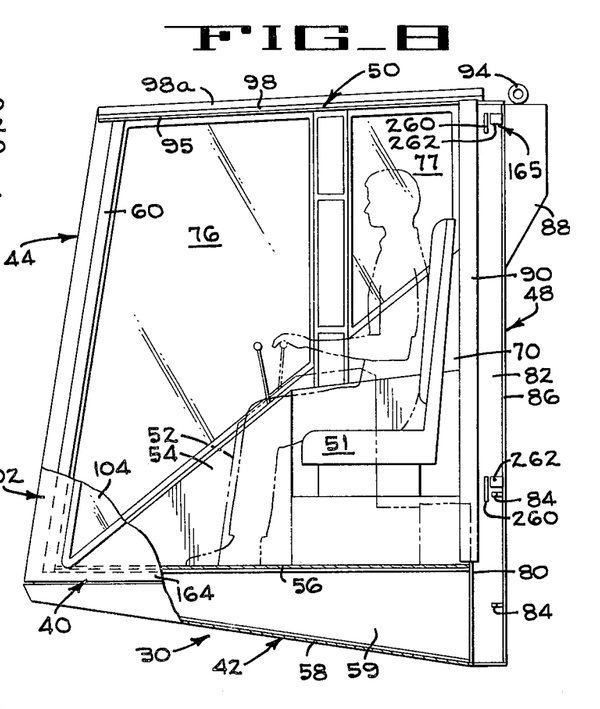
FIG. 8 is a sectional view taken along line 8—8 of FIG. 6 of the main fixed structure of cab.

In the main fixed or stationary structure of the cab 30, the bottom section 42, as shown in FIGS. 7 and 8, comprises a horizontal floor plate 56 with vertical stiffening members 57 and 59 supporting the horizontal floor plate upon an inclined bottom plate 58 to form a trapezoidal shaped box section having its deeper end at the rear of the cab. The outer longitudinal side of the box section is spaced inwardly from the outer side of the cab and slopes inwardly toward the inner side of the cab as indicated in FIG. 7. The operator's seat 51 is supported from the floor plate 56 at the central rear end of the cab. The right hand operator's console 54 is also supported from the floor plate 56 adjacent the right hand side of the operator's seat 51 and the inward side wall section 46. The console 54 is a narrow box like structure in which some of the operating controls of the machine are mounted, as indicated in FIGS. 6–8, at a comfortable armchair height.

Figures 1, 2, 4:
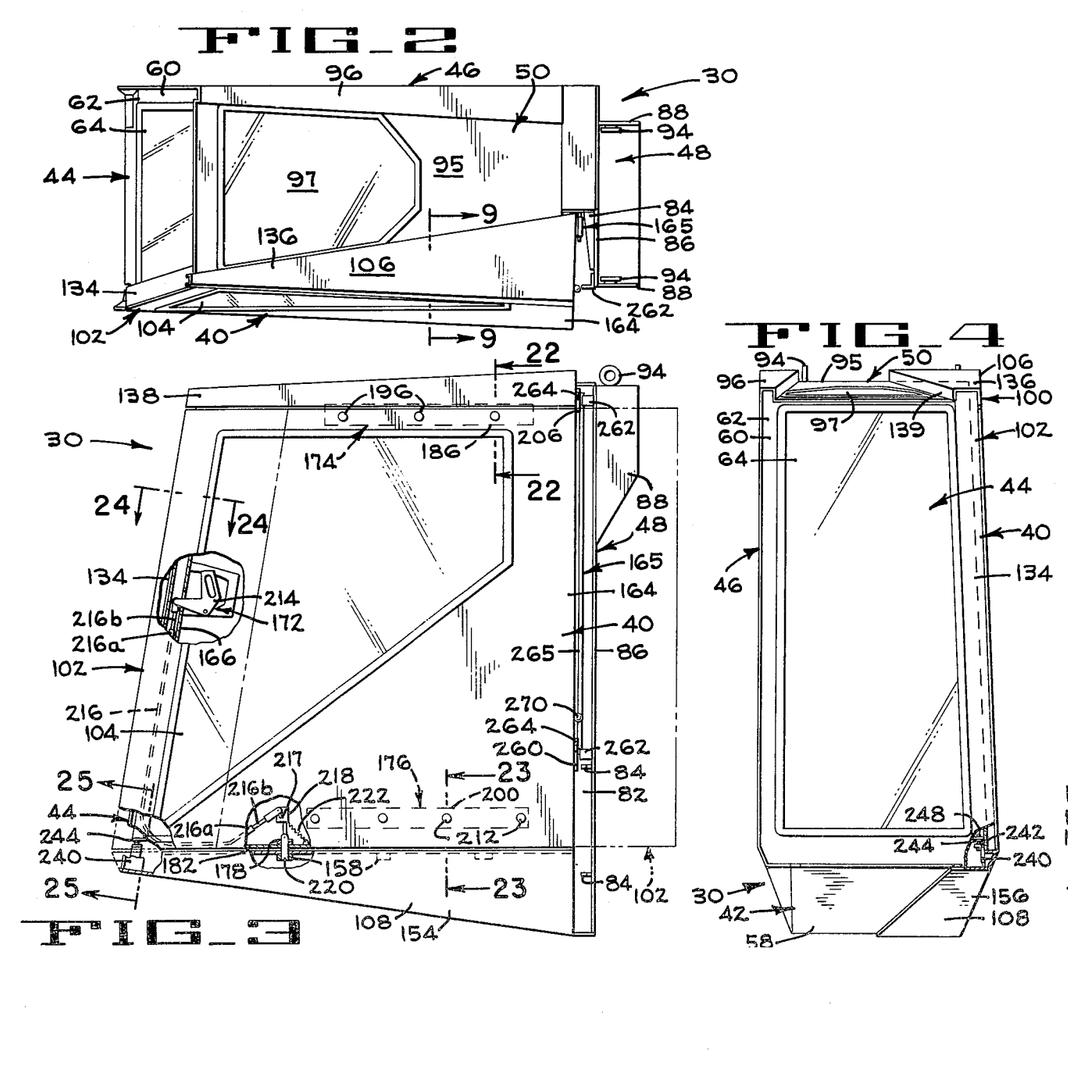
FIG. 2 is a plan view of the cab with the expansion wall section in the closed position.
FIG. 4 is a front end elevational view.

The front end wall section 44, as shown in FIGS. 4 and 8, comprises tubular members 60 which form a front frame 62 having a large cut-out for a gasketed window 64 which extends over a considerable area within the front frame 62 as indicated in FIG. 4. The tubes 60 form front corner posts which are integral with the front frame 62. The tubes and the front frame are rigidly secured to the bottom section 42. The plane of the front end wall section is inclined slightly from the vertical to improve visibility through the window 64.

Figure 5:
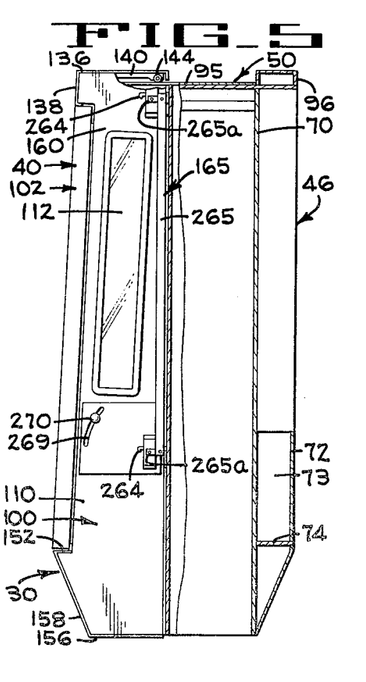
FIG. 5 is a rear end elevational view shown with portions partially broken away.

The inward side wall section 46, as shown in FIGS. 5 and 6, comprises a vertical plate 70 with stiffening members 72, 73, 74 and vertical stiffening members as shown in FIG. 5, and gasketed windows 76, 77 as indicated in FIG. 8. The inward side wall section is rigidly secured to the bottom section 42 and the front end wall section 44.

The rear end wall section 48, as shown in FIGS. 2, 7, 8 comprises an inner vertical back plate 80, a pair of spaced vertical bars 82, a pair of horizontal stiffening ribs 84, an outer vertical plate 86, a pair of vertical support plates 88, and a vertical curved seal plate 90. The vertical back plate 80 forms the rear panel of the inside of the cab and is rigidly secured to the bottom section 42 and the inward side section 46. The pair of spaced vertical bars 82 are perpendicularly secured to the outside of the inner back plate 80 with one of the bars adjacent to stiffening member 57 and the other bar at an intermediate lateral location between the ends of plate 80 so that an open space 92 is provided for the movement of the rear end of the expansion wall section 40, as shown in FIG. 6. The outer vertical plate 86 is rigidly secured to the outstanding edges of the spaced bars 82, but one end projects laterally toward the outer side of the cab with the horizontal stiffening ribs 84 located between one of the bars 82 and the projecting portion of outer plate 86. The pair of support plates 88 are perpendicularly secured to the upper portion of outer plate 86 at laterally spaced intervals and project rearwardly. An eyebolt 94 is attached to the top of each support plate 88 for ease in handling the cab structure prior to its attachment to the rotatable upper frame 34 of the machine. Seal plate 90 is attached to the inner vertical back plate 80 adjacent its outer corner as indicated in FIG. 6. Seal plate 90 has a flat portion along the open vertical side of the cab structure to provide a flat sealing surface for the expansion wall section 40 when it is in its closed position and a curved portion along the edge of the inner backplate 80 to provide a sealing surface for the rear end portion of the expansion wall section 40 when the expansion wall section is expanded and in its open position.

Figure 9:
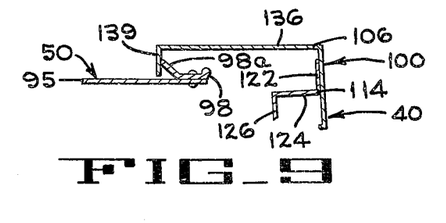
FIG. 9 is a sectional view taken along line 9—9 of FIG. 2.

The top section 50, as shown in FIGS. 2, 7–9, comprises a top plate 95 which includes an inverted channel portion 96 as a stiffener along the inside side section 46, a window 97, a seal bar 98 and a sealing flange 98a. A portion of top plate 95 is cut-out to receive the gasketed window 97 as shown in FIG. 2. The seal bar 98 is secured to the top plate 95 parallel to the outside longitudinal edge of the cab. Seal bar 98 includes the inclined flange portion 98a which contacts a portion 139 of the expansion wall section 40 when the latter is in its open position to effect a seal as indicated in FIG. 9. The sealing flange 98a is attached to the top plate 95 along its outer longitudinal side edge. The flange 98a further abuts seal plate 90 of the rear end wall section to continue the sealing surface horizontally toward the front of the cab when the expansion wall section 40 is in its closed position. The top plate 95 is joined to the front, rear and side sections to complete the main fixed structure of the cab which is then enclosed on all sides except along the outward longitudinal side of the cab which is closed by the expansion wall section 40 to be described next. The top section 50 is inclined slightly toward the front of the cab as indicated in FIGS. 3 and 8.

The expansion wall section 40, as shown in FIGS. 10–16, is substantially trapezoidal in shape in its vertical plane to generally conform to the outline of the outward longitudinal side of the fixed cab structure previously described so as to close the opening in this outward side of the cab. This expansion wall section is hinged at the front outer edge of the cab to swing in a horizontal plane through an angle $x$ (FIG. 24) from a closed position as indicated in FIG. 2 to an expanded or open position providing additional room for the operator at the rear of the cab as indicated in FIG. 6. The expansion wall section 40 comprises a vertical side frame 100, a horizontally sliding access door 102 with a window 104, an upper cover 106, a lower bottom enclosure 108, a vertical rear end portion 110 which includes a window 112, and the left hand operator's console 52.

Figures 11, 12:
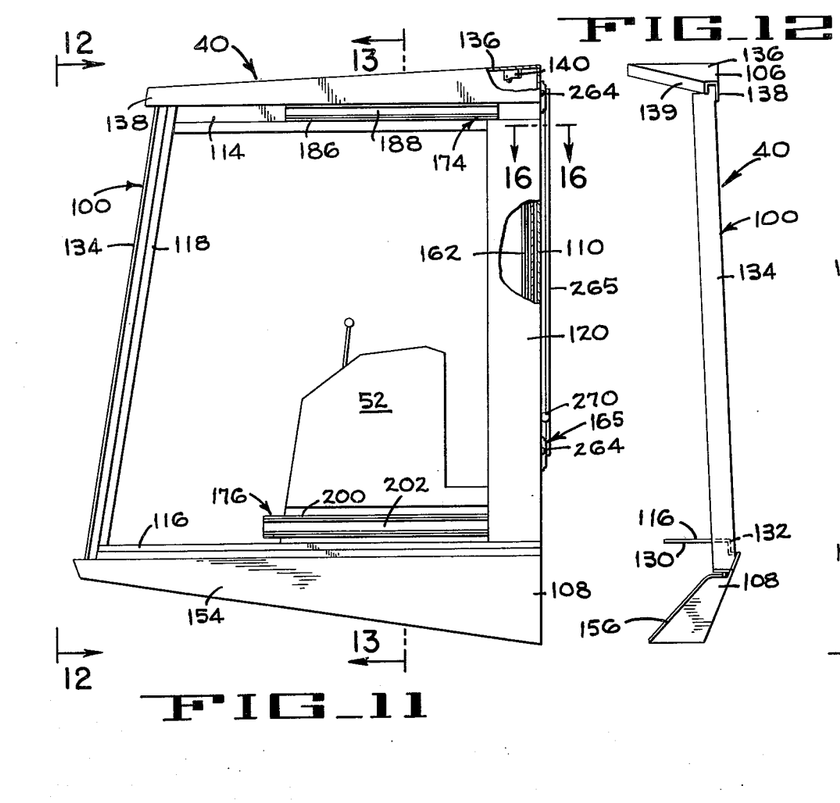
FIG. 11 is a side elevational view of the expansion wall section.
FIG. 12 is a front end elevational view of the expansion wall section taken in the direction of arrows 12—12 of FIG. 11.
Figure 13:
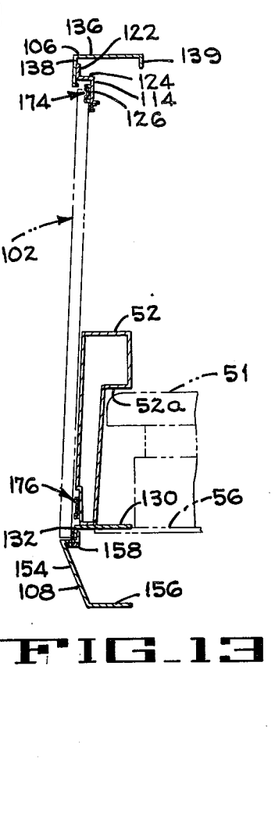
FIG. 13 is a cross-sectional view taken along line 13—13 of FIG. 11.
Figure 14:
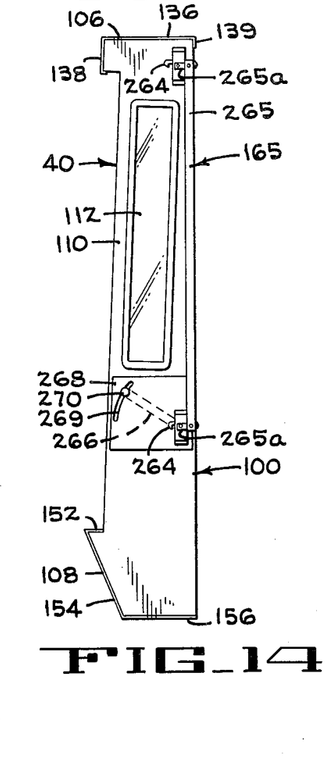
FIG. 14 is a rear end elevational view of the expansion wall section.
Figures 18, 19, 20, 21, 22, 23, 24:
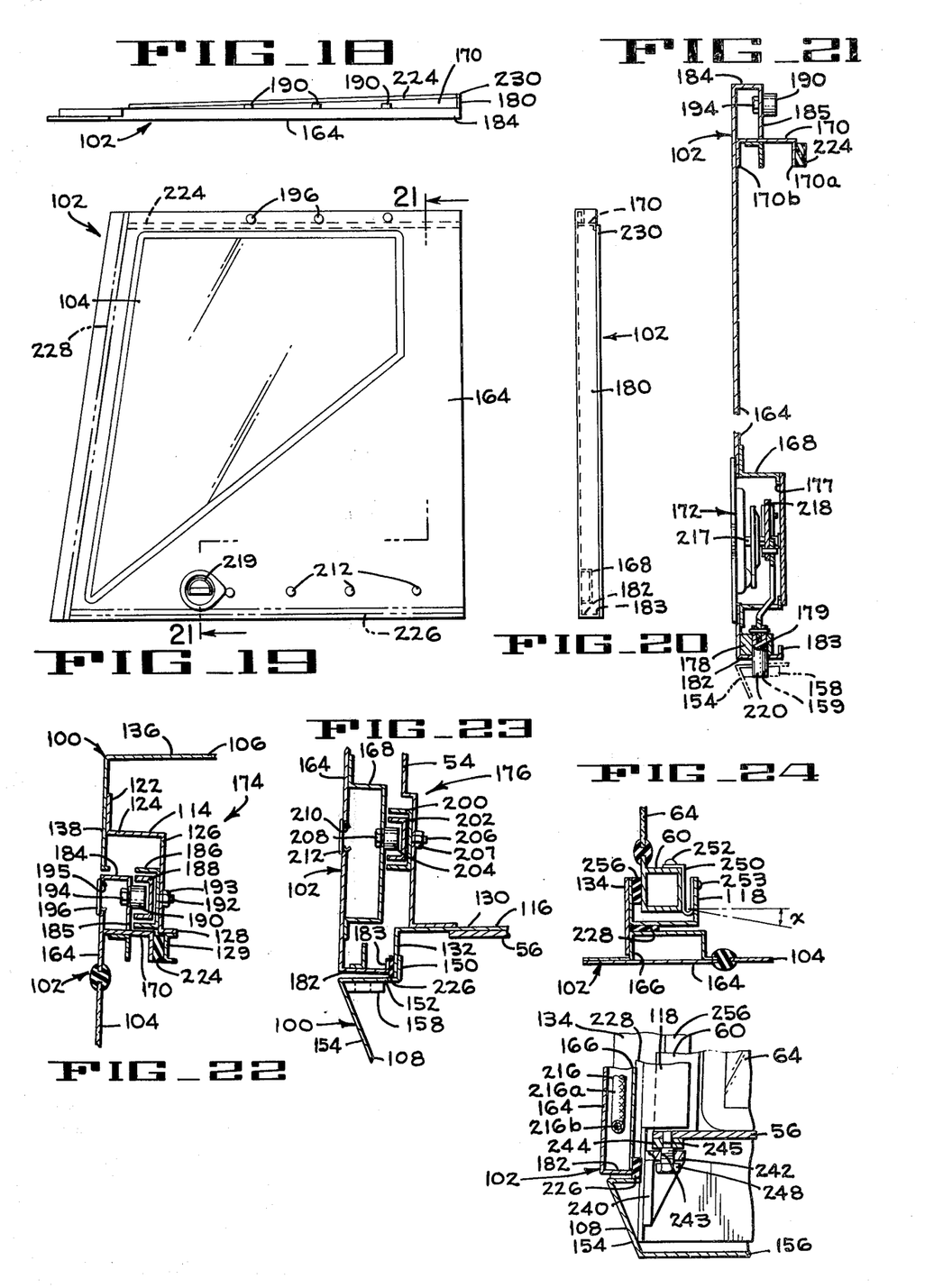
FIG. 18 is a plan view of the sliding door of the expansion wall section.
FIG. 19 is a side elevational view of the sliding door.
FIG. 20 is a rear end view of the sliding door.
FIG. 21 is a sectional view taken along line 21—21 of FIG. 19.
FIG. 22 is a sectional view taken along line 22—22 of FIG. 3.
FIG. 23 is a sectional view taken along line 23—23 of FIG. 3.
FIG. 24 is a sectional view taken along line 24—24 of FIG. 3.

As shown more particularly in FIGS. 11 and 13 the vertical side frame 100 is a framework formed mainly by an upper horizontal member 114, a lower horizontal member 116, an inclined channel shaped member 118 at the front corner and a vertical flanged plate 120 at the rear end. The upper horizontal member 114 is a Z-shaped formed plate having a narrow outer upstanding flange 122, a horizontal leg 124, a vertical leg 126 of progressively increasing height toward the rear end, and a horizontal flange 128 projecting inwardly. A channel shaped member 129 is attached to flange 128 of member 114 in a manner to provide a vertical sealing surface, which tapers inwardly in the horizontal plane, to match the tapered thickness of the door 102 as indicated in FIG. 22. The lower horizontal member 116 is an angle-shaped plate having a wide horizontal flange 130 extending inwardly, so as to overlap the floor plate 56, and a downwardly projecting flange 132. The inclined member 118 is U-shaped in cross-section with its legs spaced sufficiently to partially encircle the outer corner post tube 60 and to provide additional clearance for a hinge, shown in FIG. 24 and which will be described later. A bar 134 is secured to one leg of member 118 and projects outwardly as shown in FIG. 24. Member 118 and bar 134 are joined to horizontal members 114 and 116 and are inclined from the vertical to conform to the slope of the front end section 44 and tube 60. The flanged plate 120 is joined to horizontal members 114 and 116 at the rear end between flanges 128 and 130.

Figure 10:
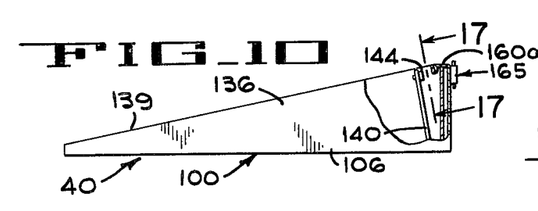
FIG. 10 is a top view of the expansion wall section of the present cab with a portion broken away.
Figure 17:
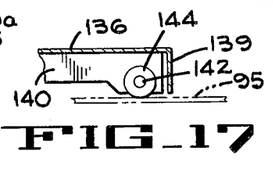
FIG. 17 is a sectional view taken along line 17—17 of FIG. 10.

The upper cover 106 of the expansion wall section 40 is a plate with vertical flanges on its two longitudinal sides. The main planar portion 136 of this cover is substantially trapezoidal in shape with the narrow end located at the front of the cab and the wider end at the rear. The longitudinal flange 138 is also substantially trapezoidal in shape having its lower edge horizontal and flanged inwardly. The inner longitudinal flange 139 is relatively short to clear the cab roof plate 95 as shown in FIGS. 9 and 17. The main planar portion 136 is inclined slightly to parallel the inclination of the cab roof plate 95 which it overlaps as shown in FIG. 7. A bar 140 extends between the longitudinal side flanges 138 and 139 at a location adjacent the rear end of the cab as indicated in FIG. 10. Bar 140 supports a cab screw 142 on which a roller 144 is rotatably mounted. Roller 144 rides on roof plate 95 of the cab structure to support the rear end of the expansion wall section 40 in a rolling manner as indicated in FIG. 17. The outer longitudinal flange 138 is secured on the outer upstanding flange 122 of the horizontal member 114, as shown in FIG. 22, to join the cover 106 to the side frame 100.

The lower bottom enclosure 108 of the expansion wall section 40 comprises a formed plate having a vertical upstanding flange 150 (FIG. 23), an upper horizontal leg 152 extending outwardly from the flange, an inclined leg 154 extending downwardly and inwardly from the horizontal leg at a slight angle from the vertical, a lower inwardly facing horizontal flange 156 (FIG. 25), and a plurality of reinforcing plates 158 (FIG. 23). The upstanding flange 150 is secured to the rear of the vertical flange 132 of the horizontal member 116. The outwardly extending horizontal leg 152 has a length equal to horizontal flange 124 of the upper horizontal member 114 directly above so as to provide a lower recess for door 102. The inclined leg 154 is substantially trapezoidal in shape, corresponding generally to the outline of the bottom section 42 of the cab structure, and has its deeper end adjacent the rear of the cab. The horizontal flange 156 projects inwardly and overlaps portions of the bottom section 42. Plates 158 are provided at spaced intervals under the horizontal leg 152 and vertical holes 159 (FIG. 21) are provided through both the leg 152 and the plates to receive a latching pin on the sliding door 102 which will be described later. The bottom end of bar 134 extends to the bottom enclosure 108 and is secured to leg 154 and flange 156, as indicated in FIG. 12. The top end of bar 134 extends into the cover 106 and joins flanges 138 and 139 and the main planar portion 136 to close off the narrow front end of the cover of the expansion section.

Figures 15, 16:
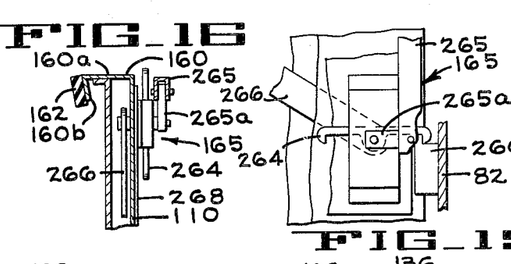
FIG. 15 is an enlarged view of lower latch shown on FIG. 14.
FIG. 16 is a sectional view taken along line 16—16 of FIG. 11.

The rear end portion 110 of the expansion wall section 40 is a vertical plate which is substantially rectangular in shape with a narrow rectangular cut-out on its outer edge to permit passage of the sliding door 102 and a centrally located cut-out to receive the gasketed window 112. The top of the rear end portion is secured to flanges 138 and 139 and the main planar portion 136 to close off the wide end of the cover 106. Along its outer vertical edge, in the area of the cut-out for the door 102, the rear end portion is secured to the vertical flanged plate 120 of the side frame. At the bottom, the rear end portion is secured to horizontal flange 130 of the lower horizontal member 116 and to the ends of flanges or legs 150, 152, 154 and 156 of the bottom enclosure 108. Along the inner vertical edge of the rear end portion, a flange 160 is provided which has a portion 160a in alignment with the inner longitudinal flange 139 of the cover 106 and a portion 106b bent inwardly at an acute angle as indicated in FIG. 16. Flange portion 160b further has a gasket 162. Flange 160 and gasket 162 provide a seal with curved sealing plate 90 on the fixed cab structure, as shown in FIG. 6, when the expansion wall section is in the expanded cab position. The flange and gasket provide a seal with the rear plate 80 of the cab structure when the expansion wall section is in the retracted cab position. Thus, the rear end 110 of the expansion wall section 40 is joined to side frame 100, cover 106 and bottom enclosure 108 to completely close off the rear end of the expansion wall section. A latching system 165, which will be described later, is mounted on the rear end portion 110 of the expansion wall section to latch the expansion wall section to the stationary cab structure in either the retracted cab position or the expanded cab position. The left hand operator's console 52 is mounted on the horizontal flange 130 of the lower horizontal member 116 of the side frame 100 of the expansion wall section. This console is a narrow box-like structure in which some of the operating controls for the machine are mounted as indicated in FIGS. 6–8, 11 and 14 at a comfortable arm chair height. The inwardly facing side of the console is recessed as indicated in FIG. 13 at 52a to permit the upper portion of the console to overlap seat 51 when the expansion wall section is in its retracted cab position.

The access door 102 as shown in FIGS. 18–24 is mounted in the side frame 100 to slide horizontally so as to provide access for the operator to enter the cab. The door is latchable in several positions and is sealed in its retracted position as will be described hereinafter. The door 102 comprises the window 104, an outer plate 164, a first channel shaped stiffening member 166 along the front edge, a second channel shaped stiffening member 168 along the bottom longitudinal edge, a tapered reinforcing member 170 along the upper longitudinal edge, a door latching system 172, an upper slide assembly 174 and a lower slide assembly 176. The outer plate 164 is substantially trapezoidal in shape to conform to the opening in the side frame 100 of the expansion wall section 40. The forward edge of outer plate 164 is inclined to conform to the slope of the forward section 44 of the cab structure and the inclined channel member 118 of the side frame of the expansion wall section. The channel shaped stiffening members 166 and 168 are secured to the back of the outer plate 164 inside of the cab.

The channel member 166, shown in FIG. 24, is set back from the forward edge of the outer plate 164 so that when the leg of the channel member 166 contacts the projecting end of bar 134 when the door is closed, the leading edge of plate 164 projects beyond to align with the ends of bottom section 42, the front wall section 44 and the top section 50 of the main fixed cab structure as indicated in FIG. 3. A large cut-out is provided in plate 164 to receive the gasketed window 104, which is substantially trapezoidal as indicated in FIG. 19. The channel stiffening member 168 is placed horizontally adjacent the lower longitudinal edge of the outer plate 164, as indicated in FIG. 23. A circular cut-out 177 is provided in member 168, intermediate of its length, to provide access for mounting the latching assembly 172. A reinforcing plate 178, with a hole 179, is also provided below this cut-out 177 for use with the latching system 172 as indicated on FIG. 21.

Plate 164 has a right angled leg 180 (FIG. 18) along its rear vertical edge and the inwardly facing side of the door 102 tapers accordingly from a thin section at the front edge to a thicker section at the rear edge as indicated in FIG. 18. Plate 164 has a right angled horizontal flange 182 (FIG. 23) along its bottom longitudinal edge with a narrow upstanding flange 183 on the inner end of the horizontal flange. As is shown in FIGS. 20 and 21, the upper longitudinal edge of the door is closed by the horizontal tapered member 170 which has an inverted U-shape in cross section with legs 170a and 170b projecting vertically downward. The horizontal width of this member 170 varies from the front edge to the rear edge of the door to provide a tapered surface along the inwardly facing leg 170a. The outwardly facing leg 170b is secured to the back of plate 164. Along its upper horizontal longitudinal edge, plate 164 extends vertically above the horizontal member 170 and has an inwardly facing horizontal leg 184 and then a downwardly projecting vertical flange 185 to join member 170 as indicated in FIG. 21. The width of horizontal leg 184 corresponds to the depth of channel member 166 on the front edge of the door.

The access door 102 is suspended within the side frame 100 on upper and lower roller slide assemblies 174 and 176 to move the door horizontally from a closed and sealed position, as indicated in solid line in FIG. 3, to an open position, so the operator can enter the cab. A partially open door position is shown in phantom line in FIG. 3. The roller slide assemblies are constructed similarly to the extension type roller supports for the drawers of a conventional office correspondence filling cabinet. As shown in FIG. 22, the upper slide assembly 174 comprises a fixed channel member 186, an inner movable channel member 188 and a plurality of rollers 190. The fixed member 186 is secured to the vertical leg 126 of the Z-shaped horizontal member 114 to the side frame 100 by a plurality of spaced welding studs 192 and nuts 193. The inner member 188 is freely supported within the fixed outer member 186 on anti-friction pads or small rollers (not shown) to move telescopically within the outer member and to project longitudinally outward horizontally in a cantilever manner for supporting the access door in an open position. The rollers 190 are rotatably supported at spaced intervals on cap screws 194 in the vertical flange 185 of the door plate 164. Access holes 195 are provided in the door plate 164 to insert the cap screws 194 in flange 185 and spring type closure caps 196 cover these access holes after the rollers 190 are mounted on the cap screws 194. The lower roller slide assembly 176, as shown in FIG. 23, is similar to the upper roller slide assembly and comprises an outer fixed-channel member 200, an inner movable channel member 202, and a plurality of rollers 204. The outer channel member 200 is secured to the left hand control console 52 by a plurality of spaced welding studs 206 and nuts 207. The inner channel members 202 is freely supported within the outer fixed channel member 200 on anti-friction pads or small rollers (not shown) to move telescopically within the outer channel member and to project longitudinally outward horizontally in a cantilever manner for supporting the access door in an open position. The rollers 204 are rotatably supported at spaced intervals on capscrews 208 in the lower longitudinal channel member 168 on the back of the door plate 164. Access holes 210 are provided in the door plate 164 to insert capscrews 208 and spring type closure caps 212 cover these holes 210 after the rollers 204 are mounted on the capscrews 208. The rollers 190 and 204 enable movement of the door relative to the inner channel members 188 and 202 which in turn can move relative to the fixed outer channel members 186 and 200.

The door latching system 172 is indicated in the cut-away sections of FIG. 3 and in FIGS. 19 and 21. This latching system comprises an inside latch handle 214, a flexible shaft 216, a connector plate 218, and a latch pin 220. The inside latch handle 214 is pivotally attached to the front channel member 166 on the door 102. The flexible shaft 216 is a conventional push-pull type of remote control flexible shaft assembly having a stationary casing 216a and an inner flexible movable member 216b. One end of the inner member 216b is attached to the pivotable inside latch handle 214 and the other end is attached to the connector plate 218 which turns with a shaft 217 that is pivotally attached to the lower longitudinal channel member 168 of the door. The flexible shaft 216 is directed down the front channel member 166 and bent in a gentle curve to run horizontally along the lower channel member 168. The casing 216a is suitably anchored at several locations to hold the casing stationary. The pivoted connector plate 218 is spring biased by a tension spring 222. Latch pin 220 is suitably connected to the connector plate so that when the handle 214 is pulled down the flexible shaft 216b pivots the connector plate to raise the latch pin 220, which is guided by hole 179 in plate 178 on the door, freeing the pin from the holes 159 in the horizontal leg 152 and reinforcing plates 158 of the bottom portion of the outside side frame 100 of the expansion wall section 40. The access door 102 can then be manually pushed to a selected open position. When the position of pin 220 coincides with the location of another set of holes 159, the pin will drop into engagement with the holes and relatch the door in its new position under the tension of spring 222. A latch handle 219, positioned on the outside of door plate 164, is mounted on the pivot shaft 217 that extends through the connector plate 218 and upon rotation of the handle in a counter-clockwise direction, the connector plate is pivoted to raise the latch pin 220.

The sliding access door 102 is gasketed so the door is sealed to the side frame 100 when the door is in the closed position. As described previously the back of the door is provided with a horizontal tapered surface which compresses the gaskets into a tight sealing relationship when the door is completely closed but frees the gaskets as the door is opened, by providing increasing clearance between the surfaces of the door and the side frame. A gasket 224 is attached horizontally to the inward flange 170a along the top of the door and a gasket 226 is attached horizontally to the downwardly projecting flange 132 of the lower horizontal member 116 as indicated in FIG. 23. Another gasket 228 is secured to the outward side of the channel shaped member 118 along the front edge of the door as indicated in FIG. 24. A final gasket 230 is secured to the vertical rear edge of flange 180 of the door to complete the encirclement of the edges of the door to effect sealing when the door is in its closed position.

The expansion wall section 40 is hinged to the outer front corner of the fixed main structure of the cab so that the expansion wall section can swing horizontally from a closed position to an expanded cab position when the operator is in the cab. The rear of the expansion wall section is rollingly supported by the top of the fixed cab, as shown in FIG. 17 and as previously described. A lower hinge is provided, as shown in the broken away section of FIG. 3 and in FIG. 25. An angle bracket 240 with a top plate 242 having a tapped hole 243 is attached to the lower front corner of the side frame 100 of the expansion wall section. Another plate 244 with a hole 245 is attached to the underside of the horizontal floor plate 56 of the main fixed cab structure. A shouldered cap screw 248 is screwed through tapped hole 243 in plate 242 and is freely received in hole 245 of the plate 244 to provide a vertical pivot for the lower hinge. The upper hinge is shown in FIG. 24 and is located on the outer front corner of the cab below the joint of the cover section 106 and the sliding door 102. A thin flexible stainless steel strip 250 is fastened to corner post tube 60 with screws 252 at one end and bent into a U-shape in the space provided between tube 60 and one leg of the partially encircling channel member 118 on the side frame 100 of the expansion wall section. The opposite end of flexible strip 250 is fastened to the one leg of channel member 118 of the expansion wall section with screws 253. When the expansion wall section 40 is swung to its expanded position, flexible strip 250 flexes and the U-shape opens, while the lower hinge pivots about capscrew 248, to provide the hinged movement for the expansion wall section. A gasket 256 is provided, as shown in FIG. 24, between the channel member 118 of the expansion wall section and the corner post tube 60 of the cab structure to seal the front edge of the expansion wall section to the fixed cab structure as it swings on its hinges.

The expansion wall section 40 is further provided with the latching systems 165 to lock the expansion wall section at the rear end to the fixed cab structure in both the expanded and the contracted position. The latching system 165, as shown in FIGS. 2, 3, 5, 6, 8 and 14–16, comprises a pair of inner lock bars 260, a pair of outer lock brackets 262, a pair of pivoted latches 264, a connector bar 265, a lever 266, and a mounting plate 268.

As shown more particularly on FIGS. 6 and 8, the inner pair of lock bars 260 are fastened in a vertically spaced relationship to the one of the pair of spaced vertical plates 82, of the main cab structure, which is adjacent the open space 92. Each inner lock bar 260 is a small rectangular block having an upwardly projecting lip to provide a locking surface and the lock bars are fastened to plate 82. The pair of outer lock brackets 262 are small angle clips secured to the outer vertical edge of the outer vertical plate 86 with one leg projecting perpendicular to plate 86. These brackets are vertically spaced apart at the same elevation as lock bars 260. The pair of pivoted latches 264 are mounted in a vertically spaced relationship to the rear end 110 of the expansion wall section 40 at an elevation to be operable with corresponding lock bars 260 or lock brackets 262 depending upon whether the expansion wall section is in its expanded or retracted cab position.

Each latch 264 has a vertically depending tapered end portion which, as the latch pivots, rides over the top edge of either inner lock bar 260 or other lock bracket 262 and then drops down over the projecting lip to create a positive lock between the latch and the lock bar or lock bracket. The pair of latches 264 are interconnected by the connector bar 265, which has arms 265a at each end connected to the latch pivots, to operate the latches in unison. The lever 266 is operably connected to the pivot of the lower latch 264 at one end to swing in arc so as to operate the latches. The other end of lever 266 has an end portion at right angles to the main portion of the lever which projects through an arcuate slot 269 in mounting plate 268. The end portion of the lever 266 has a knob 270 for convenience in moving the lever 266 so as to operate the latches 264 and release them from either the lock bars 260 or the lock brackets 262. The mounting plate 268 supports the lower latch 264 with lever 266 and is attached to the rear end plate 110. Thus knob 270 may be moved downwardly to lift latches 264 so they are released from lock bars 264, the expansion wall section 40 may then be swung from its retracted cab position to its expanded cab position and the knob 270 raised to move the latches 264 into their locked position on lock brackets 262 to lock the expansion wall section in its expanded cab position.

The operator can then release the latching system 172 on the access door 102, push the door open and enter the cab. With the expansion wall section latched in the expanded cab position, the operator has maximum room for operation of the machine in arm chair-like comfort when seated on seat 51 with the control consoles 52 and 54 at convenient locations adjacent each hand. The access door 102 is normally closed when the operator is in the cab to take full advantage of the comfortable environmental capabilities provided by the present expansible operator's cab.

Although the best mode contemplated for carrying out the present invention has been herein shown and described, it will be apparent that modifications and variations may be made without departing from what is considered to be the subject matter of the present invention.

What is claimed is:

1. An operator's cab for machinery that is mounted upon a highway vehicle, said cab having a stationary unit and an expansion wall section coupled with the stationary unit for movement sideways of the vehicle to increase the interior cab space by moving outwardly for an operator controlling the machinery and to decrease the overall width of the vehicle by moving inwardly to within maximum limits for clearance purposes during highway travel; said expansion wall section being hinged at its end located forwardly of the vehicle to the stationary unit so as to pivot about a generally vertical axis; said expansion wall section including a side frame and flanges projecting from the top, rear end, and bottom edges of the side frame towards the stationary unit; said stationary unit being shaped to receive the flanges projecting inwardly from the side frame and to maintain a dust proof sealing engagement therewith regardless of the inward or outward positioning of the expansion wall section; said flange projecting from the top of the expansion wall section being in overlapping relationship with the roof of the stationary unit and said expansion wall section further including a roller mounted at the rear end portion of the top flange to roll upon the roof of the stationary unit and thereby support the expansion wall section rearwardly of the forward hinge.

2. In construction machinery of the type having a transport vehicle, material handling equipment mounted upon the transport vehicle, and an operator's cab mounted beside the material handling equipment to provide an overall width dimension of the equipment and the cab that is limited by clearance requirements for highway travel; said operator's cab having an inward side wall section that is located adjacent the material handling equipment and front, top, bottom and back panels extending laterally outward from the inward side wall section wherein the improvement comprises an expansion wall section having a vertical side frame being hingedly connected to the cab front panel adjacent the outermost edge thereof, flanges stiffening the frame and projecting laterally inward from the frame to envelope the outermost edges of the top, bottom and back panels of the cab, and an operator s control console for the material handling equipment being mounted on the inward side of the frame; said expansion wall section being movable outward to increase the interior cab space for an operator controlling the material handling equipment and being movable inward to decrease the overall width dimension of the equipment and the cab to meet clearance requirements; said expansion wall section flanges maintaining a dust proof sealing engagement with the top, bottom and back panels of the cab in either the outward or inward positions.

3. An expansion wall section for an operator's cab as described in claim 2 wherein said operator's cab has an operator's seat positioned therein and the operator's control console is shaped to extend over a portion of the operator's seat when the expansion wall section is in an inward position but extends adjacent the side of the operator's seat when the expansion wall section is in an outward position.

4. In construction machinery of the type having a transport vehicle, material handling equipment mounted upon the transport vehicle, and an operator's cab mounted beside the material handling equipment to provide an overall width dimension of the equipment and the cab that is limited by clearance requirements for highway travel; said operator's cab having an inward side section that is located adjacent the material handling equipment and front, top, bottom and back panels extending laterally outward from the inward side wall section; wherein the improvement comprises an expansion wall section being hingedly connected to the cab front panel and having flanges projecting laterally inward to envelope the outermost edges of the top, bottom and back panels of the cab; said expansion wall section being movable outward to increase the interior cab space for an operator controlling the material handling equipment and being movable inward to decrease the overall width dimension of the equipment and the cab to meet clearance requirements; said expansion wall section flanges maintaining a dust proof sealing engagement with the top, bottom and back panels of the cab in either the outward or inward positions; said expansion wall section having an access door mounted on the outermost side thereof for slidable movement longitudinally of the expansion wall section.

* * * * *